Feb. 1, 1955        K. KÜNZI        2,700,949
PIPING ASSEMBLY STAND
Filed March 23, 1951
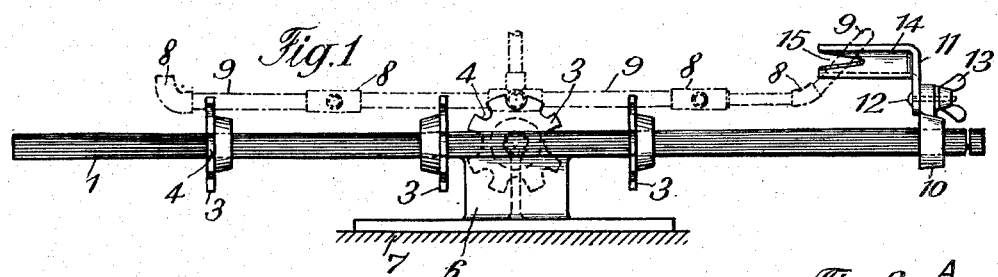
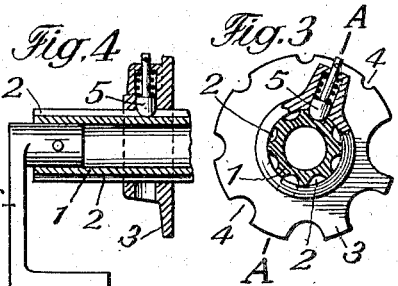
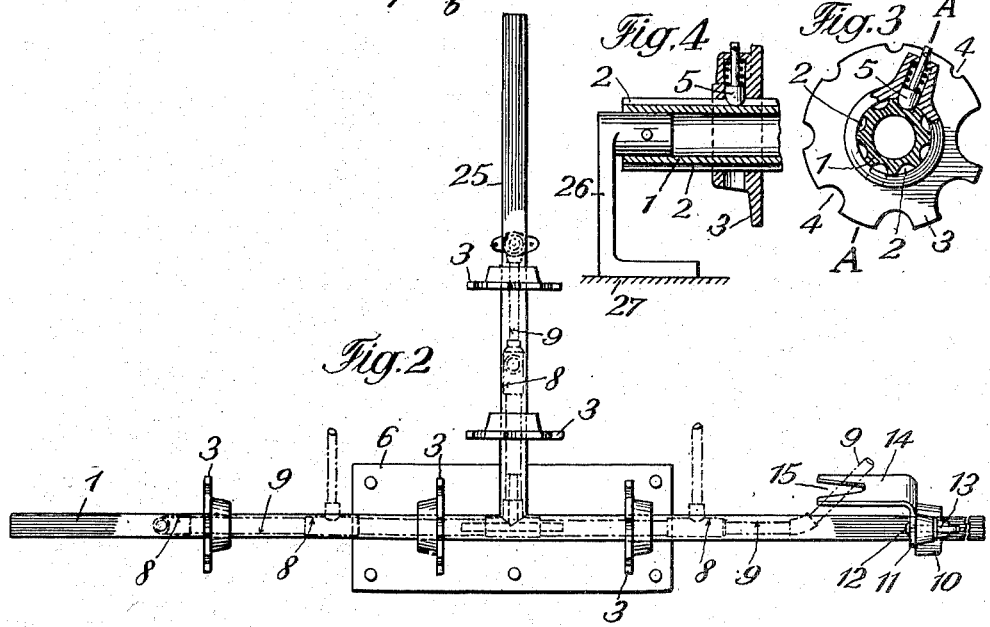
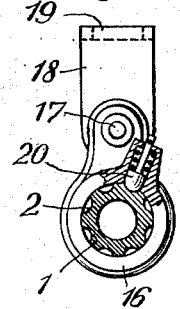
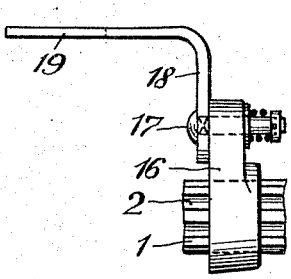
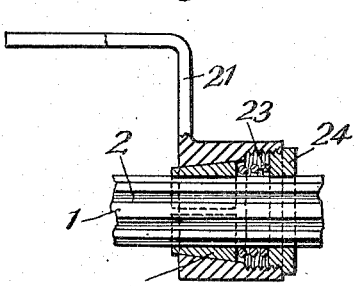
INVENTOR:
Karl Kunzi
By
Henderson, Lind & Cornack
Attorneys.

United States Patent Office 2,700,949
Patented Feb. 1, 1955

2,700,949

PIPING ASSEMBLY STAND

Karl Künzi, Schaffhausen, Switzerland, assignor to Georg Fischer Aktiengesellschaft, Schaffhausen, Switzerland Application March 23, 1951, Serial No. 217,190

Claims priority, application Switzerland April 4, 1950

5 Claims. (Cl. 113—102)

My present invention relates to a novel auxiliary means for piping assembly, which for example may be used to connect piping by welding or soldering, which piping comprises pieces of pipe and fittings inserted between the same.

In accordance with my present invention, a rod-like supporting element is used which on its circumference is provided with a plurality of uniformly spaced longitudinal grooves. Discs are mounted on the said element, and each disc on its circumference has a plurality of spaced notches of different dimensions, the number of said notches corresponding to that of the longitudinal grooves on said supporting element. The notched discs are adapted to be movable on the said element lengthwise thereof and rotatable thereon, and they are provided with detents which are engaged in one of the longitudinal grooves of said element so as to lock the discs against rotation and longitudinal movement on said element.

A plurality of forms of my present invention are shown in the accompanying drawing in which—

Fig. 1 is a front elevation of the stand,

Fig. 2 shows a top plan view thereof,

Fig. 3 shows, in a larger scale, a section through the supporting element, and an end-view of a disc mounted thereon, partly in section;

Fig. 4 shows a longitudinal section through a disc and one end portion of the supporting element on the line A—A of Fig. 3, the said element in this case being supported on a base through means different from those shown in Figs. 1 and 2;

Fig. 5 shows, in a larger scale, a modification of an auxiliary element in elevation, which may be used in connection with the stand, Fig. 6 shows the auxiliary element in an end-view, partly in section, slidingly mounted on the supporting element which is shown in section; and Fig. 7 shows a further modification of the auxiliary element in elevation and slidingly mounted on the supporting element.

In Figs. 1–7, the numeral 1 designates the rod-like, horizontally disposed supporting element which, in the present case, is tubular for example. This tube on its circumference is provided with eight longitudinal grooves 2. The discs 3 are movably and rotatably mounted on the tube 1 and are provided on their peripheries with eight notches 4 of different sizes. In each disc 3 is provided a radially disposed spring-loaded detent pin 5 which, by rotating the disc 3, may be engaged alternatively in any of the longitudinal grooves 2 of the element 1. A support 6 for the latter is affixed to the underside thereof and, in turn, may be secured to a base 7.

Pieces of pipe 9, having fittings 8 inserted between them, which pipes and fittings have to be interconnected by welding or soldering and are indicated in Figs. 1 and 2 by dash-and-dot lines, are supported in the notches 4 of the discs 3. An auxiliary element 10 may be slidingly mounted on the element 1 and has an angularly bent bracket 11 pivoted thereto on a bolt 12. A wing nut 13 mounted on the bolt 12 serves for clamping the bracket 11 relatively to the element 10. The free end of the horizontally disposed leg 14 of the bracket 11 is provided with an open V-slot 15 which serves for holding a piece of pipe 9 which extends at an angle with respect to the other pieces of pipe 9.

The auxiliary element 16 shown in Figs. 5 and 6 is somewhat different from the element 10 just described. It has a cylindrical bore, is slidably mounted on the tube 1, and has an angularly-bent supporting arm 18 pivoted thereto on a pin 17. The horizontal leg 19 of the arm 18 has at its free end an open V-slot just like the bracket 11. On the element 16 is provided a spring-loaded radial detent 20 which, by turning the element 16, may be alternatively engaged in one of the longitudinal grooves 2 of the tube 1.

Fig. 7 shows a further modification of the auxiliary element. An angularly bent bracket 21 is slidably mounted on the tube 1 and has a conical bore for receiving a conical slotted clamping bush 22 which is of cylindrical configuration on the inside circumference. A compression spring 23 coiled about the tube 1 abuts at one end against that end of bush 22 which has a larger diameter, and at the other end abuts against an externally threaded nut 24 which is engaged in the hub of the bracket 21. Such arrangement forms a frictional locking means so that the bracket 21 may be turned or longitudinally moved on the tube 1 only when the user exerts a corresponding force.

In accordance with practical requirements the tube 1 may be provided with at least one lateral arm 25 which also carries a plurality of discs 3. In the example shown, the arm 25 is affixed to the tube 1, but it may be slidably mounted thereon. In the latter case, the two ends of the tube 1 are connected to supports 26 (Fig. 4) which stand on a base 27. In a further modification (not shown), the lateral arm 25 may be pivoted to the tube 1 so that its angular position with respect to the latter is variable.

What I claim as new and desire to secure by Letters Patent is:

1. A piping assembly stand comprising a base, a rod-like supporting element supported on said base with its longitudinal axis substantially situated in a horizontal plane spaced from said base, said supporting element being provided with a plurality of spaced longitudinal grooves on its circumference, a plurality of discs slidably mounted on the said element, each disc having a cylindrical bore and a hub and being provided on its circumference with a plurality of notches of various sizes, the number of said notches corresponding to that of the said grooves, and a spring-loaded detent disposed in the hub of each disc and adapted to be engaged alternatively in one of the longitudinal grooves in said element.

2. In a piping assembly stand as set forth in claim 1, a longitudinally movable bracket mounted on the said element, means slidably mounting said bracket on said element, said bracket having an angularly bent supporting arm pivoted thereto, the horizontal portion of said arm being forked, and locking means for positioning said bracket on said element whereby said forked arm can cooperate with said notches.

3. A piping assembly stand as set out in claim 2, in which the bracket has a cylindrical bore slidably mounting said bracket on said element, and a spring-loaded pin is mounted in said bracket and adapted to be engaged alternatively in one of the longitudinal grooves in said element.

4. A piping assembly stand as set out in claim 1, in which an angularly bent bracket is slidably mounted on the said element, and a frictional locking means disposed in said bracket for locking the latter both longitudinally and circumferentially to the said element.

5. A piping assembly stand as set out in claim 1, and a longitudinally grooved lateral arm on said element on which are mounted discs provided with notches of various sizes, and locking means for said discs for positioning the notches for cooperating with said aligned notches of said discs on said element.

References Cited in the file of this patent

UNITED STATES PATENTS

| Number | Name | Date |
|---|---|---|
| 568,543 | Parks | Sept. 29, 1896 |
| 1,208,522 | Duncan | Dec. 12, 1916 |
| 1,307,379 | Segal | June 24, 1919 |
| 1,453,901 | Andersen | May 1, 1923 |
| 1,469,454 | Dean | Oct. 2, 1923 |
| 2,050,049 | Findlater | Aug. 4, 1936 |
| 2,261,949 | Benner | Nov. 11, 1941 |
| 2,356,864 | Martin | Aug. 29, 1944 |
| 2,505,665 | Franck | Apr. 25, 1950 |
| 2,524,168 | Harnish | Oct. 3, 1950 |